United States Patent
Tsuji et al.

(10) Patent No.: US 10,208,832 B2
(45) Date of Patent: Feb. 19, 2019

(54) CENTRIFUGAL PENDULUM-TYPE VIBRATION ABSORBING DEVICE AND DESIGNING METHOD FOR THE SAME

(71) Applicant: AISIN AW CO., LTD., Anjo-shi, Aichi-ken (JP)

(72) Inventors: Hiroki Tsuji, Anjo (JP); Akihiro Nagae, Anjo (JP); Yoichi Oi, Ama (JP); Kazuto Maruyama, Anjo (JP); Tomoki Inagaki, Hekinan (JP); Hideaki Miyakoshi, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 3 days.

(21) Appl. No.: 15/125,461

(22) PCT Filed: Feb. 24, 2015

(86) PCT No.: PCT/JP2015/055267
§ 371 (c)(1),
(2) Date: Sep. 12, 2016

(87) PCT Pub. No.: WO2015/151654
PCT Pub. Date: Oct. 8, 2015

(65) Prior Publication Data
US 2017/0097064 A1      Apr. 6, 2017

(30) Foreign Application Priority Data

Mar. 31, 2014   (JP) .................. 2014-072314

(51) Int. Cl.
*F16F 15/14*      (2006.01)

(52) U.S. Cl.
CPC ........ *F16F 15/145* (2013.01); *F16F 2226/00* (2013.01); *F16F 2232/02* (2013.01)

(58) Field of Classification Search
CPC ... F16F 15/145; F16F 2226/00; F16F 2232/02
See application file for complete search history.

(56) References Cited

U.S. PATENT DOCUMENTS 8,161,740 B2    4/2012   Krause et al.
8,910,762 B2 *  12/2014  Takikawa .............. F16F 15/145
                                                   188/378

(Continued)

FOREIGN PATENT DOCUMENTS

DE    102008057647 A1    6/2009
JP    H05-296291 A       11/1993

(Continued)

OTHER PUBLICATIONS

May 12, 2015 Search Report issued in International Patent Application No. PCT/JP2015/055267.

*Primary Examiner* — Vicky A Johnson
(74) *Attorney, Agent, or Firm* — Oliff PLC

(57) ABSTRACT

A centrifugal pendulum-type vibration absorbing device that includes a support that rotates together with any one of the rotary elements of the damper; and a mass that is supported by the support so as to oscillate freely, wherein the centrifugal pendulum-type vibration absorbing device is designed to have an effective order that is greater by at least a correction amount associated with the hysteresis of the damper than an order of vibration that is generated in the driving device to be damped.

7 Claims, 5 Drawing Sheets

(56) References Cited

U.S. PATENT DOCUMENTS

| | | | |
|---|---|---|---|
| 2003/0012661 A1 | 1/2003 | Kawata et al. | |
| 2010/0242466 A1* | 9/2010 | Krause | F16F 15/145 60/327 |
| 2012/0080281 A1* | 4/2012 | Takikawa | F16H 45/02 192/3.28 |
| 2012/0080282 A1* | 4/2012 | Takikawa | F16H 45/02 192/3.28 |
| 2014/0174250 A1 | 6/2014 | Takikawa et al. | |
| 2014/0174869 A1* | 6/2014 | Takikawa | F16F 15/145 188/378 |
| 2017/0037929 A1* | 2/2017 | Takikawa | F16F 15/145 |

FOREIGN PATENT DOCUMENTS

| | | |
|---|---|---|
| JP | 2003-013995 A | 1/2003 |
| JP | 2011-504987 A | 2/2011 |
| JP | 2013-113348 A | 6/2013 |

* cited by examiner

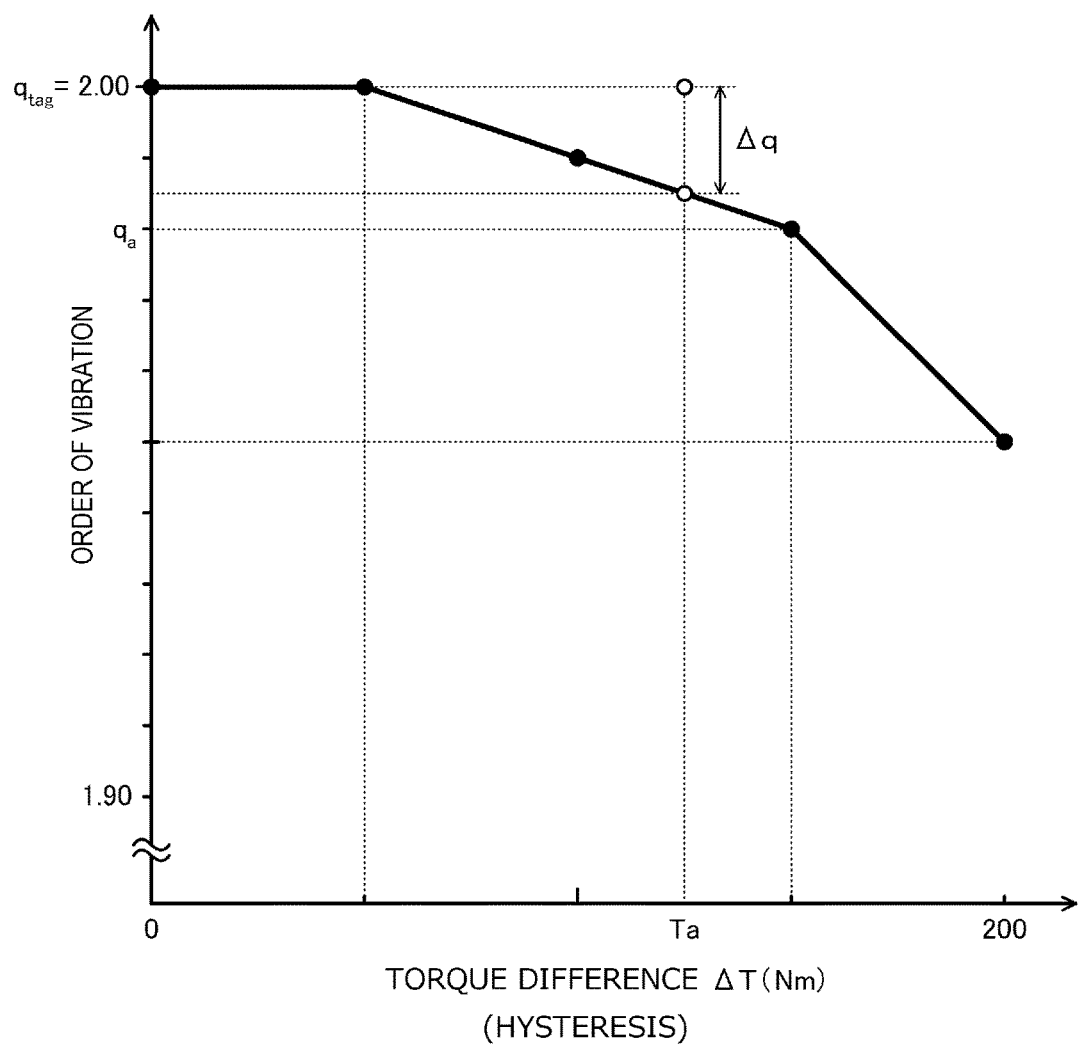

US 10,208,832 B2

CENTRIFUGAL PENDULUM-TYPE VIBRATION ABSORBING DEVICE AND DESIGNING METHOD FOR THE SAME

BACKGROUND

The present disclosure relates to a centrifugal pendulum-type vibration absorbing device that configures a starting system together with a damper mechanism that includes a plurality of rotary elements including an input element coupled to a driving device and an output element coupled to a transmission and a torque transfer elastic member that transfers torque between the input element and the output element.

As a power transmission system including a centrifugal pendulum-type vibration absorbing device, there is conventionally known a power transmission system including a hydrodynamic constituent element having at least one input member, an output member, a pump wheel and a turbine wheel connected to the output member so as not to rotate relatively, a device configured in the form of a lock-up clutch for straddling the hydrodynamic constituent element, a vibration damping device disposed within a chamber capable of being filled at least partially with an operating medium, in particular, oil, and having at least two dampers (spring units), and a centrifugal pendulum-type rotation speed adaptable dynamic vibration absorber that is connected to the vibration damping device, and configured to transfer power between the driving device and a driven device (for example, refer to JP-T-2011-504987). In this power transmission system, the rotation speed adaptable dynamic vibration absorber is designed, in relation to the effect of oil, to an effective order $q_{eff}$ that is greater by a predetermined order offset value qF than an order of vibration q that is excited by the driving device. Then, the order offset value qF is determined so as to change in proportion to a change in the order of vibration q excited so as not to coincide with the order of vibration q excited.

SUMMARY

The setting method of the effective order $q_{eff}$ described in JP-T-2011-504987 described above is understood to be such that the effective order $q_{eff}$ is set in consideration of a resistance generated by a relative motion between the mass body and the rotating oil, that is, the viscous resistance. However, the method described in JP-T-2011-504987 lacks the theoretical backing evidence. According to the studies carried out by the inventors, it has been found out that the effect of viscous resistance on the oscillation of the mass body is small under the presence of a liquid such as working oil. Consequently, even though the order of vibration of the mass body provided in the centrifugal pendulum-type vibration absorbing device is set according to the method described in JP-T-2011-504987, it is not possible to enhance the vibration absorbing performance of the centrifugal pendulum-type vibration absorbing device. On the contrary, depending upon a situation, there may be caused fears that the vibration absorbing performance is deteriorated.

Then, an exemplary aspect of the present disclosure enhances the vibration absorbing performance of a centrifugal pendulum-type vibration absorbing device that configures a starting system together with a damper mechanism that includes a torque transfer elastic member that transfers torque between an input element and an output element.

A centrifugal pendulum-type vibration absorbing device according to the disclosure configures a starting system together with a damper including a plurality of rotary elements including an input coupled to a driving device and an output coupled to a transmission and a torque transfer elastic member that transfers torque between the input and the output, the centrifugal pendulum-type vibration absorbing device including: a support that rotates together with any one of the rotary elements of the damper; and mass that is supported by the support so as to oscillate freely, wherein the centrifugal pendulum-type vibration absorbing device is designed to have an effective order that is greater by at least a correction amount associated with the hysteresis of the damper than an order of vibration that is generated in the driving device to be damped.

In general, in a damper that includes a plurality of rotary elements including an input and an output and a torque transfer elastic member that transfers torque between the input and the output, a difference, that is, a hysteresis is generated between an output torque resulting when input torque into the input is increased and output torque resulting when the input torque into the input is reduced mainly due to a friction force generated between the torque transfer elastic member and the rotary elements. Then, as a result of the inventors having made every effort in studying the centrifugal pendulum-type vibration absorbing device that configures the starting system together with the damper, it has been found out that the vibration that should be damped by nature by the centrifugal pendulum-type vibration absorbing device that is coupled to any one of the rotary elements of the damper is not damped well due to the hysteresis of the damper as described above, that is, the order of vibration that should be damped by nature by the centrifugal pendulum-type vibration absorbing device deviates from the order of vibration that is damped in reality by the centrifugal pendulum-type vibration absorbing device. Based on this fact, the centrifugal pendulum-type vibration absorbing device is designed so as to have an effective order that is greater by a correction amount associated with the hysteresis of the damper than an order of vibration that is generated in the driving device to be damped. By adopting this configuration, the vibration absorbing performance of the centrifugal pendulum-type vibration absorbing device which configures the starting system together with the damper can be improved.

BRIEF DESCRIPTION OF THE DRAWINGS

FIG. 5 is a graph showing a relationship between a hysteresis of a damper mechanism and an order of vibration that is damped by the centrifugal pendulum-type vibration absorbing device.

DETAILED DESCRIPTION OF EMBODIMENTS

Figure 1:
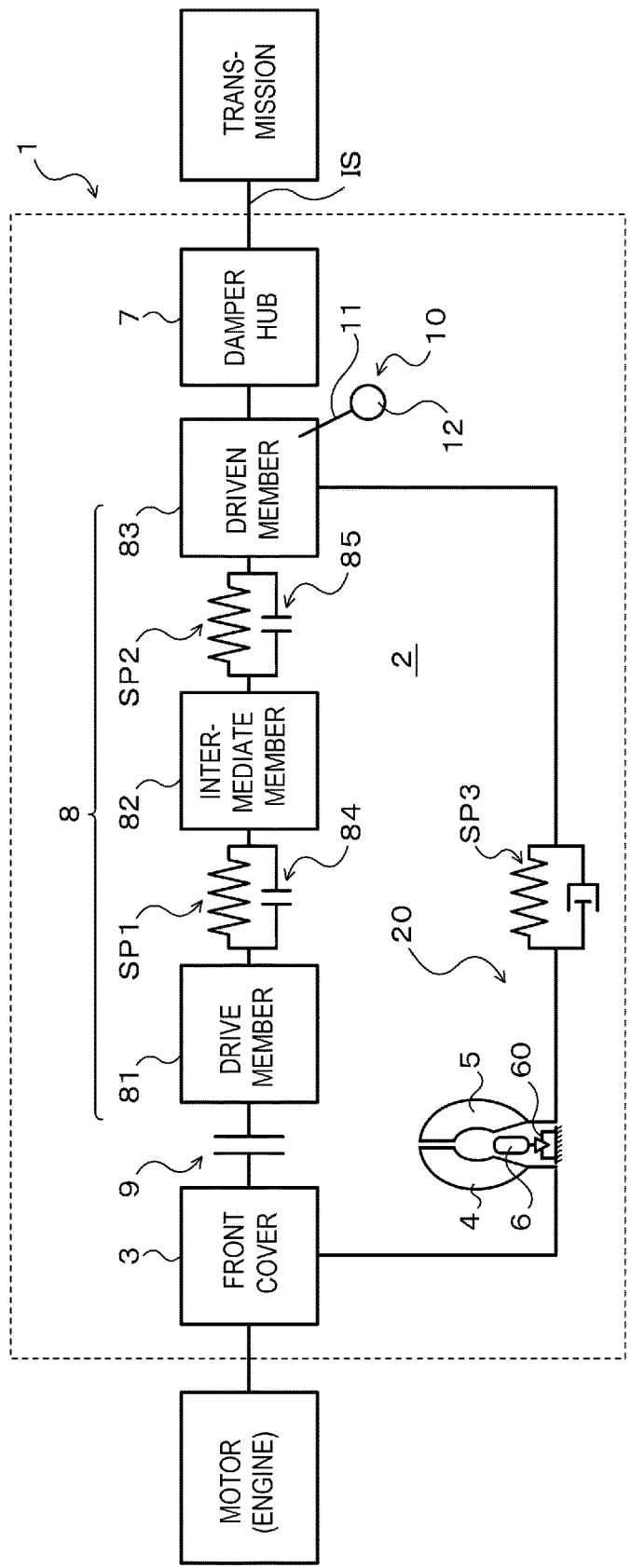
FIG. 1 is a schematic block diagram showing a starting system that includes a centrifugal pendulum-type vibration absorbing device according to the disclosure.

Next, referring to the drawings, an embodiment of the disclosure will be described.

FIG. 1 is a schematic block diagram showing a starting system 1 that includes a centrifugal pendulum-type vibration absorbing device 10 according to the disclosure. The starting system 1 shown in FIG. 1 is mounted on a vehicle that includes an engine (internal combustion engine) as a motor so as to transfer power from the engine to a transmission such as an automatic transmission (AT) or a continuously variable transmission (CVT). In addition to the centrifugal pendulum-type vibration absorbing device 10, the starting system 1 includes a front cover (input member) 3 that is coupled to a crankshaft of the engine, a pump impeller (input-side fluid transmission element) 4 that is fixed to the front cover 3, a turbine runner (output-side fluid transmission element) 5 that can rotate coaxially with the pump impeller 4, a stator 6 that rectifies a flow of working oil (working fluid) from the turbine runner 5 to the pump impeller 4, a damper hub (output member) 7 that is fixed to an input shaft IS of the transmission, a damper mechanism 8 (i.e., damper) that is connected to the damper hub 7, and for example, a single-plate friction lock-up clutch (a starter clutch) 9 that has a lock-up piston, not shown, that is coupled to the damper mechanism 8.

The pump impeller 4 and the turbine runner 5 face each other, and the stator 6 is disposed between the pump impeller 4 and the turbine runner 5 so as to rotate coaxially with the pump impeller 4 and the turbine runner 5. The stator 6 is set so as to rotate only in one direction by a one-way clutch 60. These pump impeller 4, turbine runner 5 and stator 6 form a torus (annular flow path) through which the working oil (fluid) is allowed to circulate in an interior of a fluid transmission chamber (liquid chamber) 2 that is defined by the front cover 3 and a pump shell of the pump impeller 4 and function as a torque converter having a torque amplifying function. In the starting system 1, the pump impeller 4 and the turbine runner 5 may be made to function as a fluid coupling with the stator 6 and the one-way clutch 60 omitted.

The damper mechanism 8 includes as rotary elements a drive member (an input element/input) 81, an intermediate member (an intermediate element) 82 and a driven member (an output element/output) 83. The damper mechanism 8 includes as torque transfer elements (torque transfer elastic members) a plurality of first coil springs SP1 that are disposed between the drive member 81 and the intermediate member 82 and a plurality of second coil springs (second elastic members) SP2 that have a higher rigidity (spring constant) than that of, for example, the first coil springs SP1 and which are disposed between the intermediate member 82 and the driven member 83.

In this embodiment, the first coil springs SP1 are arc coil springs that are made of a metallic material that is wound so as to have an axis extending into an arc-like shape when no load is applied thereto. This reduces the rigidity of the first coil springs SP1 (reduces the spring constant) more, whereby the rigidity (the stroke) of the damper mechanism 8 can be reduced more (made longer). Similarly, in this embodiment, the second coil springs SP2 are arc coil springs that are made of a metallic material that is wound so as to have an axis (a center line) extending into an arc-like shape when no load is applied thereto. However, as the first and second coil springs SP1, SP2, a straight coil spring may be adopted which is made of a metallic material that is wound into a spiral shape so as to have an axis (a center line) extending in a straight line when no load is applied thereto.

The drive member 81 has a plurality of abutment portions that are brought individually into abutment with ends of the corresponding first coil springs SP1. The abutment portions of the drive member 81 are disposed individually between the adjacent first coil springs SP1 so as to be brought into abutment with both the first coil springs SP1 with the damper mechanism 8 mounted. The intermediate member 82 has a plurality of first abutment portions that are brought into abutment with the other ends of the corresponding first coil springs SP1 and a plurality of second abutment portions that are brought into abutment with end portions of the corresponding second coil springs SP2. The first abutment portions of the intermediate member 82 are disposed individually between the adjacent first coil springs SP1 so as to be brought into abutment with both the first coil springs SP1 with the damper mechanism 8 mounted. The second coil springs SP2 are disposed individually between the two adjacent second abutment portions of the intermediate member 82 with the damper mechanism 8 mounted. One of the two second abutment portions is brought into abutment with one end of the second coil spring SP2, and the other of the two second abutment portions is brought into abutment with the other end of the second coil spring SP2. The driven member 83 has a plurality of abutment portions that are brought into abutment with end portions of the corresponding second coil springs SP2 and is fixed to the damper hub 7. The second coil springs SP2 are disposed individually between the two adjacent abutment portions of the driven member 83 with the damper mechanism 8 mounted. One of the two abutment portions is brought into abutment with one end of the second coil spring SP2, and the other of the two adjacent abutment portions is brought into abutment with the other end of the second coil spring SP2.

Further, the damper mechanism 8 includes, as a rotation control stopper that controls the relative rotation between the drive member 81 and the driven member 83, a first stopper 84 that controls the relative rotation between the drive member 81 and the intermediate member 82 and a second stopper 85 that controls the relative rotation between the intermediate member 82 and the driven member 83. The first stopper 84 is made up of a stopper portion that is formed on the drive member 81 and a first stopper portion that is formed on the intermediate member 82. When the stopper portion of the drive member 81 is brought into abutment with the first stopper portion of the intermediate member 82, the torsion of the first coil springs SP1 and the relative rotation between the drive member 81 and the intermediate member 82 are controlled. The second stopper 85 is made up of a second stopper portion that is formed on the intermediate member 82 and a stopper portion that is formed on the driven member 83. When the second stopper portion of the intermediate member 82 is brought into abutment with the stopper portion of the driven member 83, the torsion of the second coil springs SP2 and the relative rotation between the intermediate member 82 and the driven member 83 are controlled.

In this embodiment, the first stopper 84 (specifications of the drive member 81, the intermediate member 82 and the first coil springs SP1) and the second stopper 85 (specifications of the intermediate member 82, the driven member 83 and the second coil springs SP2) are configured (set) so that, for example, the torsion of the first coil springs SP1 and the relative rotation between the drive member 81 and the intermediate member 82 are controlled before the torsion of the second coil springs SP2 and the relative rotation between the intermediate member 82 and the driven member 83 are controlled by the second stopper 85. Specifically, the torsion of the first coil springs SP1 and the relative rotation between the drive member 81 and the intermediate member 82 are controlled by the first stopper 84 when torque transferred from the engine to the front cover 3 when lockup is executed, that is, input torque inputted into the drive member 81 reaches a torque T1 (a first value) corresponding to a relative rotation controlling angle θref that is determined to be smaller than a torque T2 (a second value) corresponding to a maximum torsion angle θmax of the damper mechanism 8. In addition, when the input torque inputted into the drive member 81 reaches the torque T2 corresponding to the maximum torsion angle θmax of the damper mechanism 8, the torsion of the second coil springs SP2 and the relative rotation between the intermediate member 82 and the driven member 83 are controlled by the second stopper 85.

In addition, in the starting system 1 of this embodiment, the turbine runner 5 is coupled to the driven member 83 that is the output element of the damper mechanism 8 via a plurality of third coil springs (third elastic members) SP3. The plurality of third coil springs SP3 and the turbine runner 5 configure a dynamic damper 20. By adopting this configuration, when the lock-up clutch 9 is engaged (including the execution of a slip control), the vibration of the whole of the damper mechanism 8 can be absorbed well by both the centrifugal pendulum-type vibration absorbing device 10 and the dynamic damper 20.

The lock-up clutch 9 operates on a hydraulic pressure from a hydraulic pressure control device, not shown. The lock-up clutch 9 executes selectively a lockup operation of coupling the front cover 3 and the damper hub 7, that is, the input shaft IS of the transmission via the damper mechanism 8 together through direct coupling of the front cover 3 to the drive member 81, and release of the lockup operation. In addition, when a predetermined slip control execution condition is established, a slip control is executed in which the lock-up clutch 9 is controlled so that a rotation speed difference (an actual slip speed) between the engine, that is, the front cover 3 and the input shaft IS, that is, the damper hub 7 coincides with a target slip speed (a rotational speed difference is generated between the engine (the crankshaft) and the drive member 81), whereby the power transmission efficiency via the lock-up clutch 9 and the fuel consumption of the engine (the motor) can be improved. The slip control execution condition is established while the lock-up clutch 9 is executing the lockup operation, the vehicle is being accelerated or decelerated, and the transmission is changing speeds.

The lock-up piston, not shown, that configures the lock-up clutch 9 is supported so as to be movable in an axial direction and be rotatable by the damper hub 7, for example. An annular frictional material is securely affixed to an outer circumferential surface and a surface facing the front cover 3 of the lock-up piston. The drive member 81 is coupled to, for example, an outer circumferential portion of the lock-up piston. It is noted that the starting system 1 may be configured so as to include a multi-plate friction lock-up clutch in place of the single-plate friction lock-up clutch 9.

Figure 2:
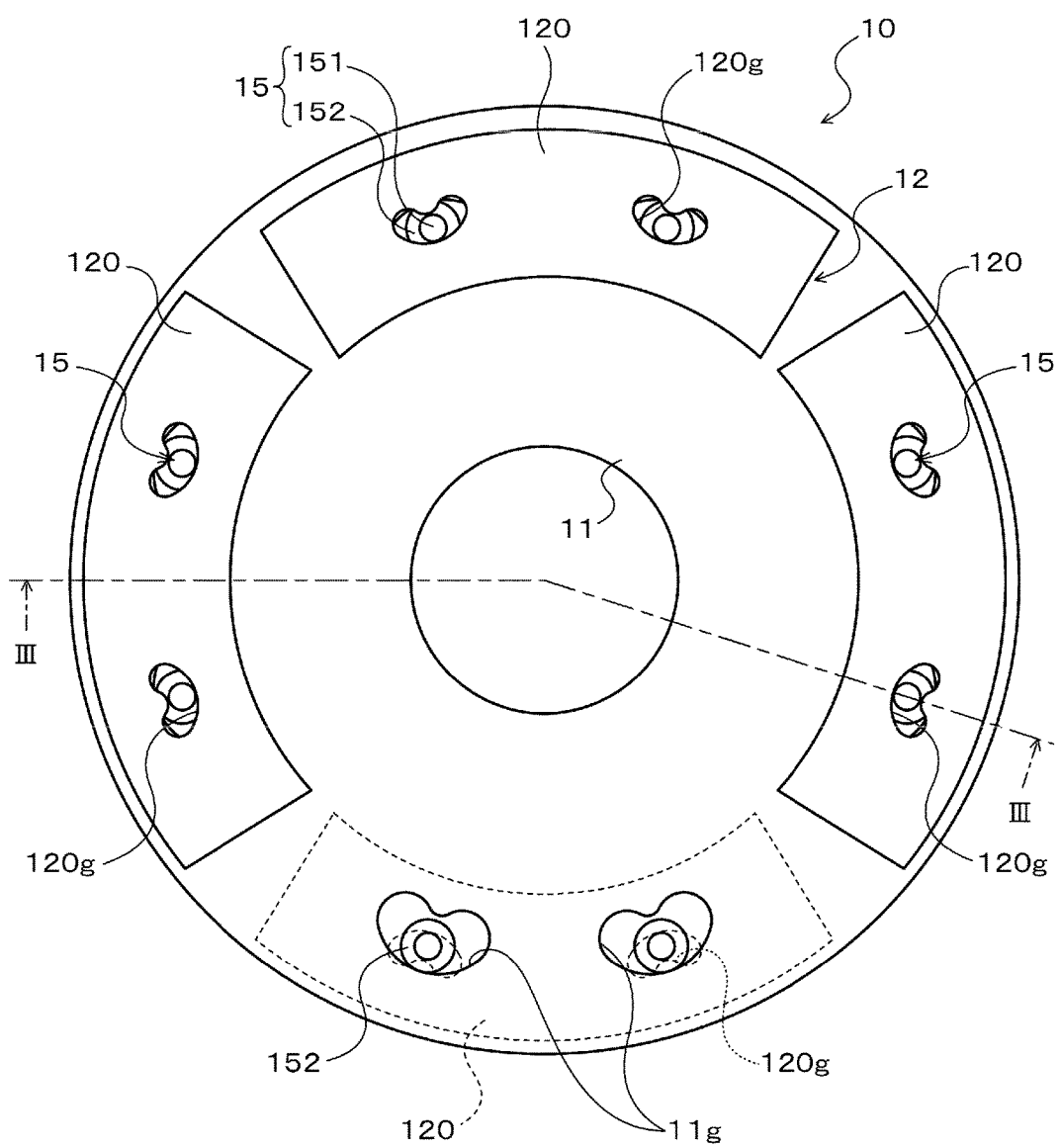
FIG. 2 is a plan view showing the centrifugal pendulum-type vibration absorbing device according to the disclosure.
Figure 3:
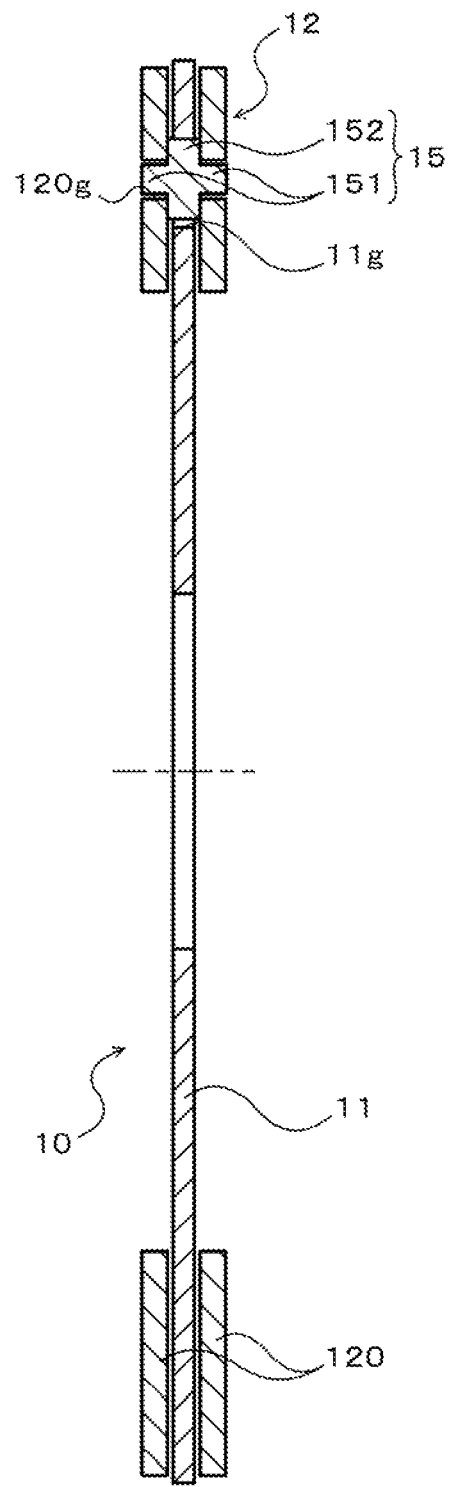
FIG. 3 is a sectional view taken along a line in FIG. 2.
Figure 4:
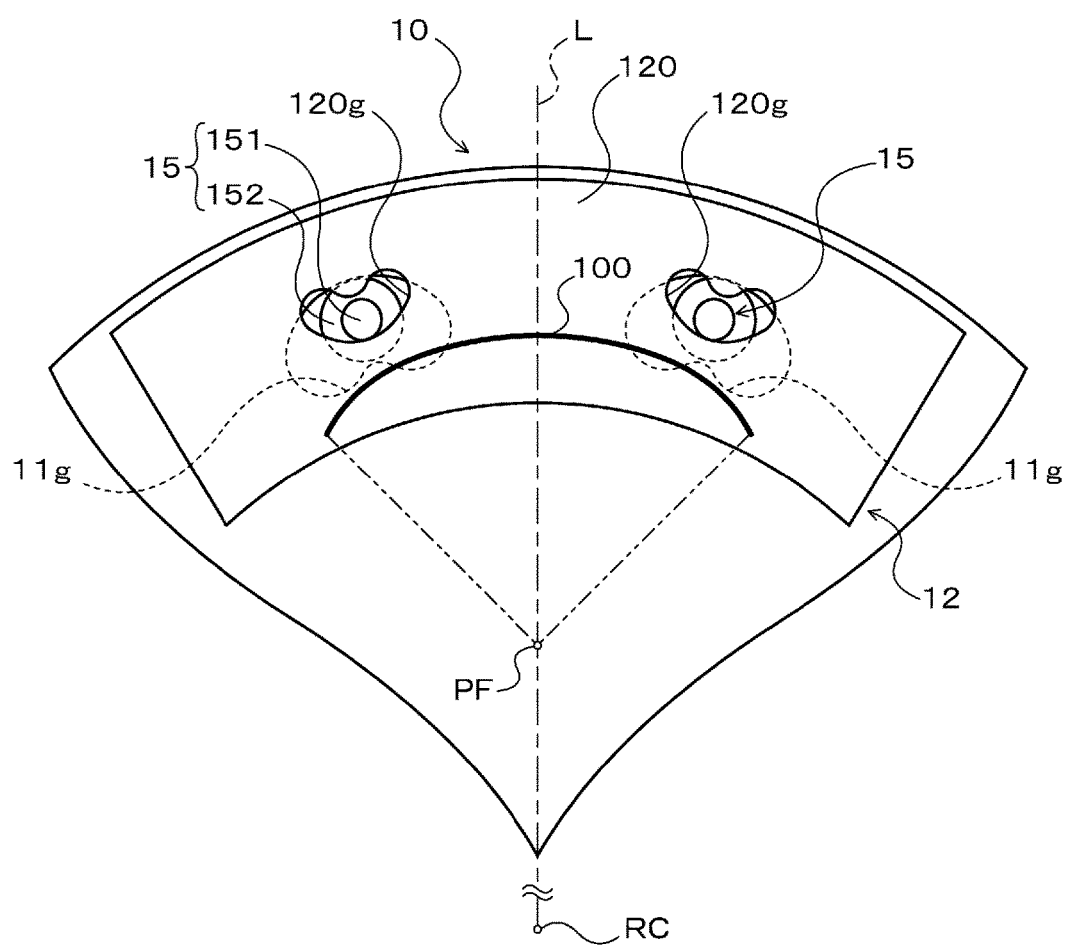
FIG. 4 is an enlarged view of the centrifugal pendulum-type vibration absorbing device according to the disclosure.

As shown in FIGS. 2 and 3, the centrifugal pendulum-type vibration absorbing device 10 includes a support member (i.e., a support) (a flange) 11 that is coupled (fixed) concentrically to the driven member 83, which is the rotary element of the damper mechanism 8, to thereby rotate together with the driven member 83 and a plurality of (in this embodiment, four) mass bodies 12 that are supported in an oscillating fashion by the support member 11 so as to move along an oscillating path 100 (refer to FIG. 4) whose center of gravity is predetermined and which lie adjacent to one another. The centrifugal pendulum-type vibration absorbing device 10 is disposed in an interior of a fluid transmission chamber 2 that is defined by the front cover 3 and the pump shell of the pump impeller 4 in such a way as to contain working oil. Then, in the centrifugal pendulum-type vibration absorbing device 10, the plurality of mass bodies 12 oscillate in the same direction relative to the support member 11 in the interior of the fluid transmission chamber 2 that is filled with the working oil as the support member 11 (the driven member 83) rotates, whereby a vibration having an opposite phase to that of the vibration of the driven member 83 of the damper mechanism 8 is given to the driven member 83. This enables the centrifugal pendulum-type vibration absorbing device 10 to absorb (damp) vibrations from the lock-up clutch 9 to the damper hub 7 (the transmission).

In this embodiment, the mass bodies 12 each have two weights 120 that face each other in an axial direction of the starting system 1 via the support member 11 and which are coupled to each other with a rivet, not shown, and two guide rollers 15. As shown in FIG. 2, the weights 120 are each made of a metallic plate that extends substantially into an arc-like shape along an outer circumference of the support member 11 as seen from the axial direction of the support member 11 and have a laterally symmetrical shape. As shown in FIG. 3, the guide rollers 15 each include two small-diameter rollers 151 and one large-diameter roller 152 that are integrated into a unit. The small-diameter rollers 151 project in opposite directions from axial end faces of the large-diameter roller 152.

A plurality of first guide notch portions (first guide portions) 11g are formed on the support member 11 so that two (a pair of) first guide notch portions 11g are allocated for each of the mass bodies 12. Each of the pairs of first guide notch portions 11g is formed individually into a laterally asymmetrical or laterally symmetrical elongated hole whose axis is a curve that is convex outwards in a radial direction of the support member 11. This pair of elongated holes 11g is disposed symmetrical with respect to an oscillating center line (a center line of an amplitude) of the mass body 12 (i.e., mass) that includes a rotational center (an axis) of the support member 11 (the driven member 83). The large-diameter roller 152 of the corresponding guide roller 15 is inserted into the first guide notch portion 11g so as to roll freely, and the large-diameter roller 152 of the guide roller 15 rolls on an inner circumferential surface (basically, a radially external inner circumferential surface) of the corresponding first guide notch portion 11g.

Further, two (a pair of) second guide notch portions (second guide portions) 120g are formed on each weight 120 of the mass body 12. Each of the pairs of second guide notch portions 120g is formed into a laterally asymmetrical or a laterally symmetrical elongated hole whose axis is a curve that is convex towards the center of the support member 11. This pair of elongated holes is disposed symmetrical with respect to the oscillating center line of the mass body 12. The small-diameter roller 151 of the corresponding guide roller 15 is inserted into the second guide notch portion 120g so as to roll freely. The small-diameter roller 151 of the guide roller 15 rolls on an inner circumferential surface (basically, a radially internal inner circumferential surface) of the corresponding second guide notch portion 120g.

By adopting this configuration, in the centrifugal pendulum-type vibration absorbing device 10, the mass bodies 12 that are guided by the first and second guide notch portions 11g, 120g as the support member 11 rotates are allowed not only to walk around a pendulum fulcrum but also to rotate on their centers of gravity as the mass bodies 12 oscillate within their oscillating ranges. Consequently, according to the centrifugal pendulum-type vibration absorbing device 10, it is possible to damp vibrations that are transmitted to the support member 11 by making use of not only the oscillation of the mass bodies 12 around the pendulum fulcrum but also the rotational moments of the mass bodies 12 about their own centers of gravity. It is noted that the first guide notch portions 11g may be formed on the support member 11 in such a way that one first guide notch portion 11g is given to one mass body 12 and that the second guide notch portions 120g may be formed in such a way that one second guide notch portion 120g is given to one weight 120. In addition, the centrifugal pendulum-type vibration absorbing device may be configured as a so-called bifilar device that includes as the support member 11 two arms that support one mass body so as to oscillate freely.

Next, a method of setting the centrifugal pendulum-type vibration absorbing device 10 will be described by reference to FIG. 5.

The inventors have made every effort in carrying out studies to improve the vibration absorbing performance of a centrifugal pendulum-type vibration absorbing device that is coupled to a rotary element (the driven member 83 in this embodiment) of a damper mechanism like the one described above. Here, in a damper mechanism that includes a plurality of rotary elements including an input element and an output element and a torque transfer elastic member that transfers torque between the input element and the output element, in general, a difference, that is, a hysteresis is generated between an output torque (torque that is outputted from the output element) resulting when input torque into the input element is increased and output torque resulting when the input torque into the input element is reduced. Namely, the torque that is outputted from the output element when torque is transferred from the input element to the output element of the damper mechanism becomes greater than natural output torque (a theoretical value) that is determined according to the rigidity of the torque transfer elastic member mainly due to a frictional force generated between the torque transfer elastic member and the rotary elements. In addition, the torque that is outputted from the output element when the input torque into the input element is reduced (when the load is reduced) becomes smaller than natural output torque that is determined according to the rigidity of the damper mechanism mainly due to the frictional force generated between the torque transfer elastic member and the rotary elements.

The inventors have come to pay attention to the hysteresis in the damper mechanism in the process of study and analysis. Then, to deal with damper mechanisms having different constructions and specifications, the inventors have decided to quantify the hysteresis of the damper mechanism based on a difference between torque that is outputted from the output element when the torsion angle of the damper mechanism reaches a predetermined angle with the input torque into the input element increasing and torque that is outputted from the output element when the torsion angle of the damper mechanism reaches the predetermined angle with the input torque into the input element decreasing (hereinafter, referred to as a "torque difference $\Delta T$"), and have studied accurately a correlation between the torque difference $\Delta T$ and an order of vibration that is damped by the centrifugal pendulum-type vibration absorbing device.

Specifically, the inventors have obtained the torque difference (hysteresis) $\Delta T$ through simulation for each of a plurality of damper mechanisms of different specifications that include a rotary element to which a centrifugal pendulum-type vibration absorbing device is coupled and have also obtained through simulation an order of vibration that is damped by the centrifugal pendulum-type vibration absorbing device on each of the plurality of damper mechanisms. In making simulations, a torsion angle of a damper mechanism when a torque difference $\Delta T$ is induced (a predetermined angle) is referred to as an angle that is smaller than a torsion angle when a relative rotation between an input element (a drive member) and an output element (a driven member) is controlled by a rotation control stopper. In relation to a two-stage or three-stage damper mechanism, the torsion angle concerned is referred to as an angle that is slightly smaller than a torsion angle that corresponds to input torque when the torsion of a torque transfer elastic member having lowest rigidity is controlled by anyone of a plurality of stoppers (in the damper mechanism 8 in the embodiment, a torsion angle coincides with the relative rotation control angle θref). In addition, the centrifugal pendulum-type vibration absorbing device of each damper mechanism is understood to damp a vibration (whose order q=2.0) that is transmitted from a four-cylinder engine to the input element (the drive member). FIG. 5 shows a relationship between hystereses of a plurality of damper mechanisms and orders of vibrations that are damped by centrifugal pendulum-type vibration absorbing devices of the damper mechanisms.

As shown in FIG. 5, the inventors have found out through studies and analyses that an order of vibration (vibration from the engine) that is to be damped by nature by the centrifugal pendulum-type vibration absorbing device deviates from an order of vibration that is damped (well) in reality by the centrifugal pendulum-type vibration absorbing device due to the hysteresis of the damper mechanism. Namely, the greater the hysteresis of the damper mechanism, that is, the torque difference $\Delta T$ becomes, the smaller the order of vibration that is damped in reality by the centrifugal pendulum-type vibration absorbing device that is connected to any of the rotary elements of the damper mechanism becomes than the order of vibration that is to be damped by nature by the centrifugal pendulum-type vibration absorbing devices (in the embodiment shown in FIG. 5, the vibration order q=2.0) (deviates to a lower order). Consequently, in the event that the order of vibration of the mass bodies of the centrifugal pendulum-type vibration absorbing device is set greater than the order of vibration that is transmitted to the input element (the drive member) of the damper mechanism from the engine (the driving device) (q=1.5 in the case of a three-cylinder engine, q=2.0 in the case of a four-cylinder engine) as the hysteresis of the damper mechanism becomes greater, the vibration absorbing performance of the centrifugal pendulum-type vibration absorbing device can be enhanced extremely well which configures the starting system together with the damper mechanism.

Based on the results of the studies and analyses described above, in the centrifugal pendulum-type vibration absorbing device 10 of the starting system 1, the order of vibration of the mass body 12 is determined in consideration of the hysteresis of the damper mechanism. In setting an order of vibration for the mass body 12, firstly, a value of the torque difference $\Delta T$ of the damper mechanism 8 is obtained (for example, $\Delta T = Ta$ in FIG. 5). In addition, a deviation amount of the order of vibration according to the torque difference $\Delta T$ ($=Ta$) is determined based on the relationship between the hysteresis of the damper mechanism and the order of vibration that is damped by the centrifugal pendulum-type vibration absorbing device as shown in FIG. 5. The deviation amount is obtained by subtracting the order of vibration (analysis value: "q" in FIG. 5) that is damped (well) in reality by the centrifugal pendulum-type vibration absorbing device 10 of the damper mechanism 8 at which the torque difference $\Delta T = Tt$ from the order of vibration that is transmitted from the engine to the drive member 81, that is, the order of vibration $q_{tag}$ that is generated in the engine to be damped. Further, a sum of the order of vibration $q_{tag}$ that is generated in the engine to be damped and a correction amount Δq that coincides with or is set based on the deviation amount corresponding to the torque difference ΔT (a greater value than the order of vibration that is transmitted from the engine to the drive member 81) is set as an effective order $q_{eff}$ that is a target value of the order of vibration of the mass body 12 (the centrifugal pendulum-type vibration absorbing device 10) in design.

As is seen from FIG. 5, basically, the correction amount Δq becomes greater as the hysteresis of the damper mechanism, that is, the torque difference ΔT becomes greater. Additionally, as is also seen from FIG. 5, in the event that the torque difference ΔT that denotes the hysteresis is smaller than a threshold (for example, ΔT=a value on the order of 50 Nm) that is determined through experiments and analyses, the correction amount Δq should be zero, and in the event that the torque difference ΔT is equal to or greater than the threshold, the correction amount Δq should be determined to be a value that corresponds to the torque difference ΔT (the hysteresis). According to the studies and analyses carried out by the inventors, it has been found out that in the event that the torque difference ΔT exceeds the threshold, in case the correction amount Δg is made to take a value that is equal to or smaller than 1.0% (and Δq>0) of the order of vibration $q_{tag}$ that is generated to be damped in the engine according to the torque difference ΔT (the hysteresis), good results can actually be obtained. In addition, with the damper mechanism whose hysteresis is great (for example, a damper mechanism whose torque difference ΔT>150 Nm), it has been found out that the correction amount Δq may take a value that is equal to or smaller than 2.5% of the order of vibration $q_{tag}$ that is generated to be damped in the engine (and Δq>0) according to the torque difference ΔT (the hysteresis).

Then, the oscillating path 100 (refer to FIG. 4) that the center of gravity of the mass body 12 follows is determined according to the effective order $q_{eff}$ so set, and the shapes of the first guide notch portions 11g of the support member 11 and the second guide notch portions 120g of the mass body 12 (the weights 120) are then determined based on the oscillating path 100 so determined. The oscillating path 100 should be formed by an arc or a trochoid curve such as an epicycloid, epitrochoid or cycloid and may be forming by a combination of these curves. In addition, in the event that the mass body 12 is prevented from rotating about the center of gravity thereof as the mass body 12 oscillates within the oscillating range, the first guide notch portions 11g and the second guide notch portions 120g should be formed into an elongated hole whose axis is a similar curve of the oscillating path 100.

As has been described heretofore, the centrifugal pendulum-type vibration absorbing device 10 is designed so as to have the effective order $q_{eff}$ that is grater by the correction amount Δq associated with at least the hysteresis of the damper mechanism 8 (the toque difference ΔT) than the order of vibration $q_{tag}$ that is generated in the engine to be damped. By adopting this configuration, by adopting arc coil springs as the first and second coil springs SP1, SP2, even though the hysteresis of the damper mechanism 8 is increased by such an extent that the contact areas of the first coil springs SP1 with the drive member 81 and the intermediate member 82 and the contact areas of the second coil springs SP2 with the intermediate member 82 and the driven member 83 are increased, the vibration absorbing performance of the centrifugal pendulum-type vibration absorbing device 10 that is connected to the driven member 83 can be ensured well. Consequently, in the starting system 1, vibrations from the engine can be absorbed (damped) well by the centrifugal pendulum-type vibration absorbing device 10 while realizing the reduction in rigidity of the damper mechanism 8.

Although the starting system 1 is described as being configured as the wet-type starting system, the starting system of the disclosure may be configured as a dry-type starting system from which the fluid transmission device including the pump impeller, the turbine runner, the stator and the like is omitted. Further, the dynamic damper 20 of the starting system 1 may be configured so as to have an exclusive mass body, may be coupled to the intermediate member 82 (the intermediate element) or the drive member 81 (the input element) of the damper mechanism 8, and may be omitted from the starting system 1. The rotary element to which the centrifugal pendulum-type vibration absorbing device 10 is coupled is not limited to the driven member 83 (the output element) of the damper mechanism and hence may be coupled to the intermediate member 82 or the drive member 81 (the input element) of the damper mechanism. Further, the damper mechanism incorporated in the starting system 1 may be a parallel damper mechanism in which for example, a plurality of springs (elastic members) that are disposed spaced apart radially operate in parallel or a damper mechanism having a plurality of intermediate elements.

Thus, as has been described heretofore, the centrifugal pendulum-type vibration absorbing device according to the disclosure configures the starting system together with the damper mechanism including the plurality of rotary elements including the input element coupled to the driving device and the output element coupled to the transmission and the torque transfer elastic member that transfers torque between the input element and the output element, the centrifugal pendulum-type vibration absorbing device including the support member that rotates together with any one of the rotary elements of the damper mechanism and the mass body that is supported by the support member so as to oscillate freely, in which the centrifugal pendulum-type vibration absorbing device is designed to have the effective order that is greater by at least the correction amount associated with the hysteresis of the damper mechanism than the order of vibration that is generated in the driving device to be damped.

In general, in a damper mechanism that includes a plurality of rotary elements including an input element and an output element and a torque transfer elastic member that transfers torque between the input element and the output element, a difference, that is, a hysteresis is generated between an output torque resulting when input torque into the input element is increased and output torque resulting when the input torque into the input element is reduced mainly due to a friction force generated between the torque transfer elastic member and the rotary elements. Then, as a result of the inventors having made every effort in studying the centrifugal pendulum-type vibration absorbing device that configures the starting system together with the damper mechanism, it has been found out that the vibration that should be damped by nature by the centrifugal pendulum-type vibration absorbing device that is coupled to any one of the rotary elements of the damper mechanism is not damped well due to the hysteresis of the damper mechanism as described above, that is, the order of vibration that should be damped by nature by the centrifugal pendulum-type vibration absorbing device deviates from the order of vibration that is damped in reality by the centrifugal pendulum-type vibration absorbing device. Based on this fact, the centrifugal pendulum-type vibration absorbing device is designed so as to have an effective order that is greater by at least a correction amount associated with the hysteresis of the damper mechanism than an order of vibration that is generated in the driving device to be damped. By adopting this configuration, the vibration absorbing performance of the centrifugal pendulum-type vibration absorbing device which configures the starting system together with the damper mechanism can be improved.

In addition, the correction amount may be determined so as to become greater as the hysteresis of the damper mechanism becomes greater. Namely, as a result of the studies and analyses carried out by the inventors, it has been found out that the greater the hysteresis of the damper mechanism becomes, the smaller the order of vibration that is damped in reality by the centrifugal pendulum-type vibration absorbing device that is coupled to any of the rotary elements of the damper mechanism becomes than the order of vibration that is to be damped by nature by the centrifugal pendulum-type vibration absorbing devices. Consequently, in the event that the effective order of the centrifugal pendulum-type vibration absorbing device is set greater than the order of vibration that is transmitted to the input element of the damper mechanism from the driving device as the hysteresis of the damper mechanism becomes greater by setting the correction amount greater as the hysteresis of the damper mechanism becomes greater, the vibration absorbing performance of the centrifugal pendulum-type vibration absorbing device which configures the starting system together with the damper mechanism can be enhanced extremely well.

Further, the hysteresis of the damper mechanism may be quantified based on a torque difference between torque that is outputted from the output element when the torsion angle of the damper mechanism reaches a predetermined angle with the input torque into the input element increasing and torque that is outputted from the output element when the torsion angle of the damper mechanism reaches the predetermined angle with the input torque into the input element decreasing, and the correction amount may be determined so as to become greater as the torque difference becomes greater. By adopting this configuration, after the hystereses of damper mechanisms having different constructions and specifications are quantified properly, the effective order of the centrifugal pendulum-type vibration absorbing device can be determined properly according to the quantified hystereses.

In addition, the damper mechanism may include a stopper mechanism that permits all relative rotations of the plurality of rotary elements when a torsion angle of the damper mechanism is smaller than a predetermined relative rotation controlling angle and that controls the relative rotations of at least two rotary elements of the plurality of rotary elements when the torsion angle reaches the relative rotation controlling angle, and the predetermined angle may be determined to be smaller than the relative rotation controlling angle.

Further, when the hysteresis is equal to or greater than the threshold, the correction amount is determined to be a value corresponding to the hysteresis. In this case, the correction amount may be set at a value that is greater than zero and that is equal to or smaller than 2.5% of the order of vibration that is generated to be damped in the driving device according to the hysteresis. Further, the correction amount may be set at a value that is greater than zero and that is equal to or smaller than 1.0% of the order of vibration that is generated to be damped in the driving device according to the hysteresis.

A method for designing a centrifugal pendulum-type vibration absorbing device according to the disclosure is a method for designing a centrifugal pendulum-type vibration absorbing device that includes a support member that rotates together with any one of a plurality of rotary elements of a damper mechanism that includes the plurality of rotary elements including an input element coupled to a driving device and an output element coupled to a transmission and a torque transfer elastic member that transfers torque between the input element and the output element and a mass body that is supported by the support member so as to oscillate freely, in which the centrifugal pendulum-type vibration absorbing device is designed to have an effective order that is greater by at least a correction amount associated with the hysteresis of the damper mechanism than an order of vibration that is generated in the driving device to be damped.

As in this method, in case the effective order of the centrifugal pendulum-type vibration absorbing device is determined in consideration of the hysteresis of the damper mechanism, the vibration absorbing performance of the centrifugal pendulum-type vibration absorbing device which configures the starting system together with the damper mechanism can be enhanced more.

Then, the disclosure is not limited to the embodiment that has been described heretofore in any way. It goes without saying that the disclosure can be modified variously without departing from the spirit and scope of the disclosure. Further, the mode for carrying out the disclosure that has been described heretofore represents only the specific form of the disclosure that is described in the section of the summary of the disclosure and is not intended to limit the factors of the disclosure that are described in the section of the summary of the disclosure.

INDUSTRIAL APPLICABILITY

The disclosure can be made use of in the manufacturing industry of centrifugal pendulum-type vibration absorbing devices.

The invention claimed is:

1. A centrifugal pendulum vibration absorbing device that configures a starting system together with a damper including a plurality of rotary elements including an input coupled to a driving device and an output coupled to a transmission and a torque transfer elastic member that transfers torque between the input and the output, the centrifugal pendulum vibration absorbing device comprising:
   a support that rotates together with any one of the rotary elements of the damper; and
   a mass that is supported by the support so as to oscillate freely,
   wherein the support and the mass are tuned so that an effective order of the centrifugal pendulum vibration absorbing device is greater by at least a correction amount associated with the hysteresis of the damper than an order of vibration that is generated in the driving device to be damped.

2. The centrifugal pendulum vibration absorbing device according to claim 1,
   wherein the correction amount is determined so as to become greater as the hysteresis of the damper becomes greater.

3. The centrifugal pendulum vibration absorbing device according to claim 1,
wherein the hysteresis of the damper is quantified based on a torque difference between torque that is outputted from the output when a torsion angle of the damper reaches a predetermined angle with the input torque into the input increasing and torque that is outputted from the output when the torsion angle of the damper reaches the predetermined angle with the input torque into the input decreasing, and the correction amount is determined so as to become greater as the torque difference becomes greater.

4. The centrifugal pendulum vibration absorbing device according to claim 3,
wherein the damper includes a stopper that permits relative rotations of all of the plurality of rotary elements when the torsion angle of the damper is smaller than a predetermined relative rotation controlling angle and that controls the relative rotations of at least two rotary elements of the plurality of rotary elements when the torsion angle reaches the relative rotation controlling angle, and the predetermined angle is determined to be smaller than the relative rotation controlling angle.

5. The centrifugal pendulum vibration absorbing device according to claim 1,
wherein when the hysteresis is equal to or greater than a threshold, the correction amount is determined to be a value corresponding to the hysteresis.

6. The centrifugal pendulum vibration absorbing device according to claim 5,
wherein the correction amount is set at a value that is greater than zero and that is equal to or smaller than 2.5% of the order of vibration that is generated in the driving device to be damped according to the hysteresis.

7. The centrifugal pendulum vibration absorbing device according to claim 5,
wherein the correction amount is set at a value that is greater than zero and that is equal to or smaller than 1.0% of the order of vibration that is generated in the driving device to be damped according to the hysteresis.

* * * * *